United States Patent
Bresniker

(10) Patent No.: US 7,187,674 B2
(45) Date of Patent: Mar. 6, 2007

(54) METHOD AND APPARATUS FOR USING ADAPTIVE SWITCHES FOR PROVIDING CONNECTIONS TO POINT-TO-POINT INTERCONNECTION FABRICS

(75) Inventor: Kirk M. Bresniker, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 883 days.

(21) Appl. No.: 10/000,496

(22) Filed: Oct. 30, 2001

(65) Prior Publication Data
US 2003/0081598 A1 May 1, 2003

(51) Int. Cl.
H04L 12/50 (2006.01)

(52) U.S. Cl. .................. 370/386; 370/258; 370/465; 370/400

(58) Field of Classification Search ............... 370/389, 370/386, 387, 388, 254, 256, 258, 434, 464, 370/465, 400, 356
See application file for complete search history.

(56) References Cited

U.S. PATENT DOCUMENTS

| | | | | |
|---|---|---|---|---|
| 5,408,469 A | * | 4/1995 | Opher et al. | 370/399 |
| 5,875,314 A | * | 2/1999 | Edholm | 710/317 |
| 6,147,995 A | * | 11/2000 | Dobbins et al. | 370/392 |
| 6,184,713 B1 | * | 2/2001 | Agrawal et al. | 326/41 |
| 6,693,901 B1 | * | 2/2004 | Byers et al. | 370/362 |
| 6,728,205 B1 | * | 4/2004 | Finn et al. | 370/217 |
| 6,781,953 B1 | * | 8/2004 | Naouri | 370/218 |
| 6,859,430 B1 | * | 2/2005 | Frank et al. | 370/216 |
| 2002/0181409 A1 | * | 12/2002 | Shen | 370/252 |

* cited by examiner

*Primary Examiner*—Huy D. Vu
*Assistant Examiner*—Nguyen Ngo

(57) ABSTRACT

An interconnection architecture allows a digital system to be sold with a switched or ring topology interconnection fabric that can evolve into a point-to-point interconnection fabric as the computer system is expanded, and is capable of supporting high and low end computer systems with a single design. In accordance with the present invention, unique point-to-point interconnections are provided between each pair of modules. In one embodiment, a functional unit is coupled to an adaptive 1-of-N switch, which in turn is coupled to the interconnection fabric to form a switched topology. In a second embodiment, modules are coupled to a full 3×3 switch that fronts an adaptive 2-of-N switch. The second embodiment can be coupled into a ring or switched topology, and can be used to provide additional bandwidth and redundancy.

12 Claims, 5 Drawing Sheets

METHOD AND APPARATUS FOR USING ADAPTIVE SWITCHES FOR PROVIDING CONNECTIONS TO POINT-TO-POINT INTERCONNECTION FABRICS

FIELD OF THE INVENTION

The present invention relates to interconnection fabrics in digital systems. More specifically, the present invention relates to an adaptive switch coupled to a functional unit and an interconnection fabric, with the interconnection fabric coupled to a plurality of other switches, wherein the adaptive switch selectively connects to a subset of the plurality of other switches.

DESCRIPTION OF THE RELATED ART

In the art of computing, it known to connect computing devices via interconnection fabrics. Such interconnection fabrics exist at many levels. Of course, the Internet forms an interconnection fabric that couples together computer systems world wide at a very high level. Local area networks couple together computer systems at a lower level, such as computer systems coupled together via Ethernet adapters in a typical office.

Interconnection fabrics are also used within a computer system. For example, the small computer system interface (SCSI) is often used to connect storage devices to computer systems, the universal serial bus (USB) is often used to couple scanners, printer, keyboards, and the like to computer systems, and the peripheral component interconnect (PCI) bus is often used to couple various type of expansion cards to computer systems.

Interconnection fabrics are also used at more architecturally fundamental levels of a computer system to couple together central processing units (CPUs), memory subsystems, video subsystems, I/O subsystems, and the like. For example, a high-end multi-processor (MP) server computer system may have two or more CPUs coupled together in a pod via one or more busses, with multiple pods coupled together using an interconnection fabric having a ring or crossbar topology. The term "module" will be used herein to generically refer to a digital element that is coupled to another digital element via an interconnection fabric.

Of course, interconnection fabrics may be implemented using a variety of topologies, such as the ring and crossbar topologies mentioned above. In general, a switched interconnection fabric, such as a crossbar, provides transmission paths between modules and one or more switches. The switches selectively couple transmission interconnection paths together to transmit data between modules. Such a topology is typically cost effective because the number of individual transmission paths scales well as the number of modules increases. However, the bandwidth of the interconnection fabric tends to be limited by the number of simultaneous connections provided by the switches at any given time. An interconnection fabric having a ring topology is also cost effective, since any module need only be coupled to the adjacent modules in the ring.

In contrast, a point-to-point interconnection fabric provides a unique interconnection path between each pair of modules. Point-to-point interconnection fabrics provide a high level of performance because there are many transmission paths that can carry data between modules simultaneously. However, computer systems using point-to-point interconnection fabrics to couple a large numbers of modules tend to be relatively expensive because each module must contain logic capable of connecting directly to every other module, and the complexity of this logic increases with the number of modules. Given these constraints, it is desirable to use switched or ring fabrics in low end computer systems, and point-to-point fabrics in high end computer systems.

As is known in the art, it is desirable to provide a customer with a computer system that can be expanded as the computing needs of the customer increase. Unfortunately, in prior art computer systems, the interconnection fabric between modules of the system tends to be defined when the computer system is designed, and is not easily expanded. Accordingly, if a customer purchases a low end computer system having a switched or ring interconnection fabric, the fabric tends to become a bottle neck if the computer system is upgraded. On the other hand, if the low end computer system is provided with a point-to-point interconnection fabric, the initial cost of the system will be more, and the customer may never need the extra bandwidth provided by the point-to-point interconnection fabric. Even if future expansion options are not required, a vendor still must design high and low end systems having different interconnection fabrics, which increases design costs and time to market. What is needed in the art is an interconnection architecture that allows a computer system to be sold with a switched or ring interconnection fabric that can evolve into a point-to-point interconnection fabric as the computer system is expanded, and is capable of supporting high and low end computer systems with a single design.

SUMMARY OF THE INVENTION

The present invention provides an interconnection architecture that allows a computer system (or other digital system) to be sold with a switched or ring interconnection fabric that can evolve into a point-to-point interconnection fabric as the computer system is expanded, and is capable of supporting high and low end computer systems with a single design. In accordance with the present invention, unique point-to-point interconnections are provided between every pair of modules. However, one or more modules are provided with adaptive switches capable of connecting to a subset of the modules.

In accordance with one embodiment of the present invention, a functional unit is coupled to an adaptive 1-of-N switch, which in turn is coupled to the interconnection fabric that provides unique point-to-point interconnections between all other modules. In this embodiment, the adaptive 1-of-N switch discovers another module capable of routing traffic from the adaptive switch to all other modules. Typically, this module will have a full (N+1)×(N+1) switch capable of dynamically routing data between all modules. Even though the interconnection fabric provides unique paths between all modules, not all connection paths are used. When each of the modules having an adaptive 1-of-N switch is initialized, the switch searches for a module capable of routing traffic, and connects to that module.

In accordance with a second embodiment of the present invention, each module is coupled to a full 3×3 switch that fronts an adaptive 2-of-N switch. The full 3×3 switch is capable of routing data dynamically between the module to which it is coupled, and two active ports. The adaptive 2-of-N switch couples the full 3×3 switch to two active ports. Typically, the active connections to the ports will not change during normal operation.

The ability of the combined 3×3/2-of-N switch to dynamically route data between the functional unit and two active ports can be used to either provide additional redundancy and bandwidth, or allow the modules to be coupled into a ring topology. To provide additional redundancy, the 3×3/2-of-N switch can create a primary active connection to a module having a full (N+1)×(N+1) switch capable of dynamically routing data between all modules, as described above for the adaptive 1-of-N switch. Should the primary active connection fail, a secondary connection can be established to a module having a 3×3/2-of-N switch, with this module, in turn, routing data to the full (N+1)×(N+1) switch.

To provide additional bandwidth, assume that after monitoring interconnect traffic, it is determined that a large amount of traffic flows between a particular pair of modules. Accordingly, a secondary active path can be established directly between these modules, thereby removing this traffic from the module having the full (N+1)×(N+1) switch.

Furthermore, since each module having a 3×3/2-of-N can have two active ports, the modules can be coupled together into a ring. Such a configuration does not require a module having a full (N+1)×(N+1) switch, which reduces costs even further. And yet this configuration provides redundancy. If any single connection between modules fails, traffic can still be routed around the ring in the other direction.

The modular design of the present invention provides many advantages over the prior art. First only a single design is needed for the interconnection fabric and the functional units. Only the design of the switches need vary. Using a single design provides tremendous cost and time advantages when designing, debugging, and manufacturing a system. Accordingly, a single design is capable of supporting a wide array of computer systems ranging from low end systems to high end systems.

Furthermore, the present invention provides a very easy and cost effective upgrade path for customers. As a system is upgraded by replacing modules having 1-of-N switches and 3×3/2-of-N switches, to modules having full (N+1)×(N+1) switches, the interconnection fabric seamlessly and automatically evolves from a ring topology or switched topology to a full point-to-point topology without any additional configuration required by the customer.

DETAILED DESCRIPTION OF THE PREFERRED EMBODIMENTS

The present invention provides an interconnection architecture that allows a computer system or other digital system to be sold with a switched or ring topology interconnection fabric that can evolve into a point-to-point interconnection fabric as the computer system is expanded, and is capable of supporting high and low end computer systems with a single design. In accordance with the present invention, unique point-to-point interconnections are provided between each pair of modules. However, one or more modules are provided with adaptive switches capable of connecting to a subset of the modules. As the computer system is upgraded, the adaptive switches can also be replaced with switches that connect to all (or at least additional) modules. Accordingly, the interconnection fabric can evolve from a switched or ring interconnection fabric to a point-to-point interconnection fabric as the computer system is expanded. Furthermore, the present invention can be implemented as a single design that supports both high and low end computer systems.

Figure 1:
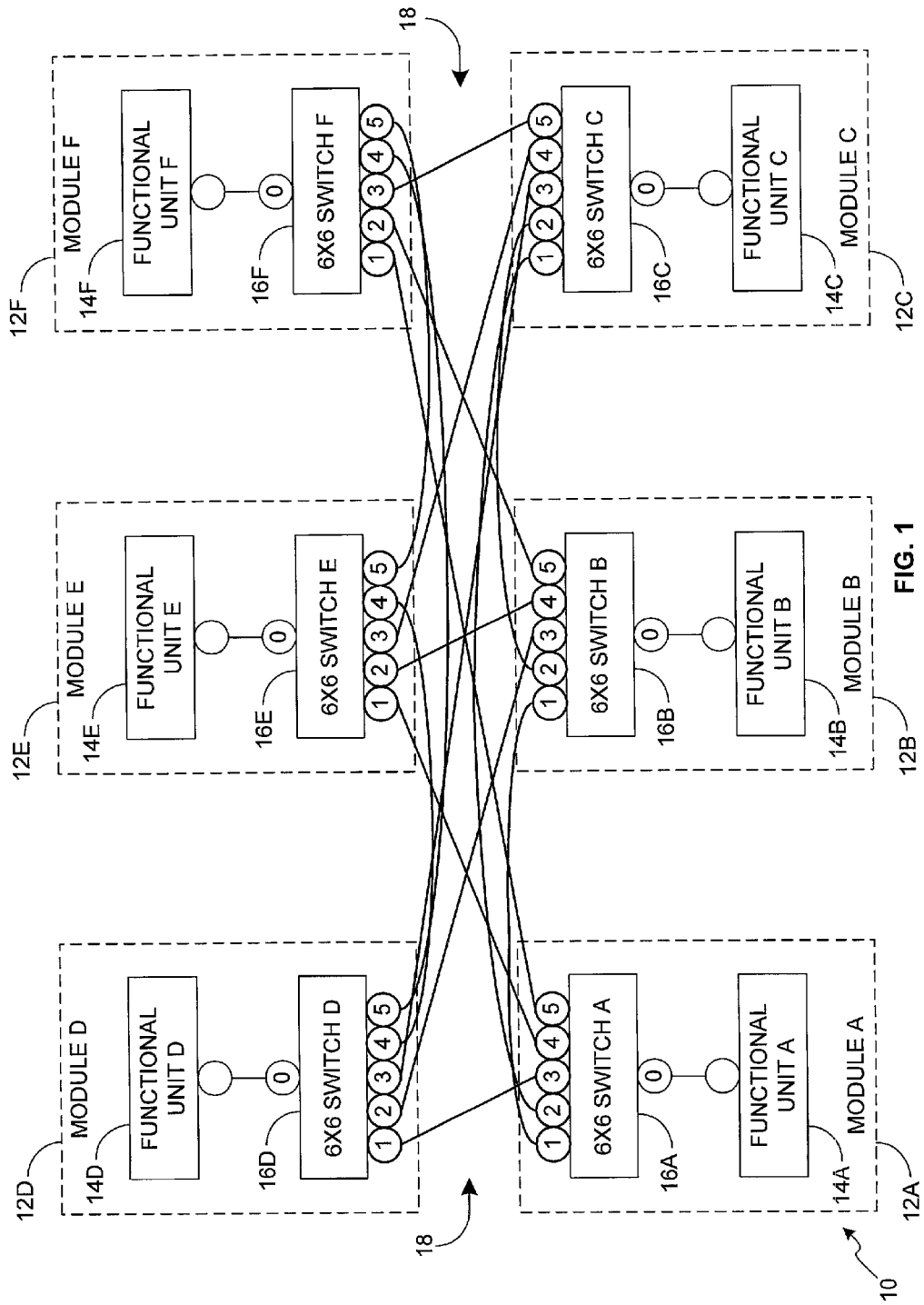
FIG. 1 illustrates a module-based computer system having a full point-to-point interconnection fabric having unique connection paths between each pair of modules, with each module having a full (N+1)×(N+1) switch capable of routing data to any other module.

Before discussing the present invention in greater detail, first consider computer system 10 of FIG. 1, which comprises six modules A, B, C, D, E, and F coupled together by a point-to-point interconnection fabric. In FIG. 1, modules A, B, C, D, E, and F are denoted by reference numerals 12A, 12B, 12C, 12D, 12E, and 12F, respectively. Each module is comprised of a functional unit and a 6×6 switch that allows any port to be coupled to any other port. For example, module 12A includes functional unit 14A and 6×6 switch 16A. Each 6×6 switch includes a port 0, which is coupled to the function unit within the module, and ports 1, 2, 3, 4, and 5, which are coupled to the other modules by interconnection fabric 18. Note that interconnection fabric 18 provides a separate and independent path between each pair of modules. Since each 6×6 switch can couple together any pair of modules, the switch of any module is also capable of creating a redundant connection between two other modules. The routing function provided by the switch is dynamic, so each 6×6 switch also includes logic to decode the address of the destination module, and create connections as required.

While system 10 while be described herein as a computer system, those skilled in the art will appreciate that the interconnection architecture shown in FIG. 1 can be applied to any type of digital system wherein it is desirable to connect modules. The data can be transmitted as packets having addresses, or as individual data words. Also note that the switches 16A–16F can be provided as separate field replaceable units (FRUs), or integrated with the functional units 14A–14F to provide a module-level FRU.

The functional units may represent computer components at a variety of architectural levels. For example, at a lower level, a module could represent a single central processing unit (CPU), a memory subsystem, or an I/O system. Alternatively, at a higher level a module could represent a pod of CPUs coupled by conventional busses, with the pods coupled together to form a multi-processor (MP) computer system. Of course, in other types of digital systems, the modules can represent other types of processing elements.

For example, in a system for routing telephone signals, the modules could represent individual routing elements.

A system coupled by a full point-to-point interconnect fabric, such as that shown in FIG. 1, overcomes the scalability limitations of conventional bussed or switched interconnections fabrics. Another feature of a full point-to-point interconnect fabric is redundancy. If any particular port or interconnect route fails, data can still be routed between any particular pair of modules via a "hop" through an intermediate module. However, this increased scalability comes at a price. To connect one module to N other modules, each module must have a (N+1)×(N+1) switch. As used herein, the constant N refers to the total number of modules minus one. Using this nomenclature, there are six modules in FIG. 1, so N is equal to five, and each module includes a 6×6 switch.

Consider a 4×4 switch having ports 0, 1, 2, and 3, with each port comprising a single data-carrying conductor that can carry a single bit at any point in time. In such a switch, six switch points are required, a first switch point to connect ports 0 and 1, a second switch point to connect ports 0 and 2, a third switch point to connect ports 0 and 3, a fourth switch point to connect ports 1 and 2, a fifth switch point to connect ports 1 and 3, and a sixth switch point to connect ports 2 and 3. Furthermore, in a 4×4 switch, two of the switch points can be active at any given time. For example, the first switch point can be active to couple the module coupled to port 1 with the functional unit coupled to the 4×4 switch at port 0, and the sixth switch point can be active to provide a redundant connection between the modules connected to ports 2 and 3.

In general, the formula for the number of switch points in a 1-bit (N+1)×(N+1) switch is given by:

$$N \frac{N+1}{2}$$

Accordingly, the number of switch points increases with the number of ports at rate greater than the linear increase in ports, but less than the square of the increase in ports. For example, assume that the interconnect paths of interconnection fabric 18 in FIG. 1 are each 32-bits, and include additional signals for addressing and other control functions. Accordingly, each of the switches 16A–16F is a 32-bit 6×6 switch. Since N is five, the number of switch points required is 480.

However, consider a system having 16 modules. In such a system, N is 15, and 16 32-bit 16×16 switches are required. The number of switch points required in each 16×16 switch is 3,840. For low-end systems having a large number of modules, the complexity of the switch can dominate the complexity of the module. And of course, the complexity of the addressing logic increases also.

One alternative for low end systems would be to provide a master module having an (N+1)×(N+1) switch, with the remaining N modules coupled to the master module. In such a system, the master module would then complete connections between any of the remaining N modules, thereby providing a switched fabric. The problem with this approach is that relationship between ports on the remaining N modules and the interconnection fabric would be fixed. Accordingly, a unique module design would be needed for each position in the interconnect fabric. The costs of managing such a system outweigh the advantages of providing a modular design.

The present invention facilitates a more generalized modular design by providing an adaptive switch having connectivity more limited than a (N+1)×(N+1) switch, but greater than the connectivity provided by a direct connection to the interconnection fabric. However, the interconnection fabric provides more point-to-point connections than the adaptive switch is capable of using simultaneously.

In the embodiments described below, the interconnection fabric provides a direct point-to-point connection between each pair of modules. Note that this does not add significant cost to a typical system. Most interconnection fabrics in computer systems are provided, in part, by slots or connectors soldered to a printed circuit board (PCB), with PCB traces providing connections between the contacts on the slots or connectors. While the number of interconnections increases the complexity of designing the PCB, once designed, the incremental cost of providing additional traces on a board is minimal. In other words, typically it will not cost more to manufacture a PCB of a given size and having a single 32-bit bus than it does to manufacture a similar PCB having two 32-bit busses. Of course, as the number PCB traces increases, it may become necessary to add additional PCB layers, thereby increasing cost somewhat. However, the increase in cost for additional PCB traces scales at a much more favorable rate than the increase in cost as N increases in an (N+1)×(N+1) switch.

Figure 4:
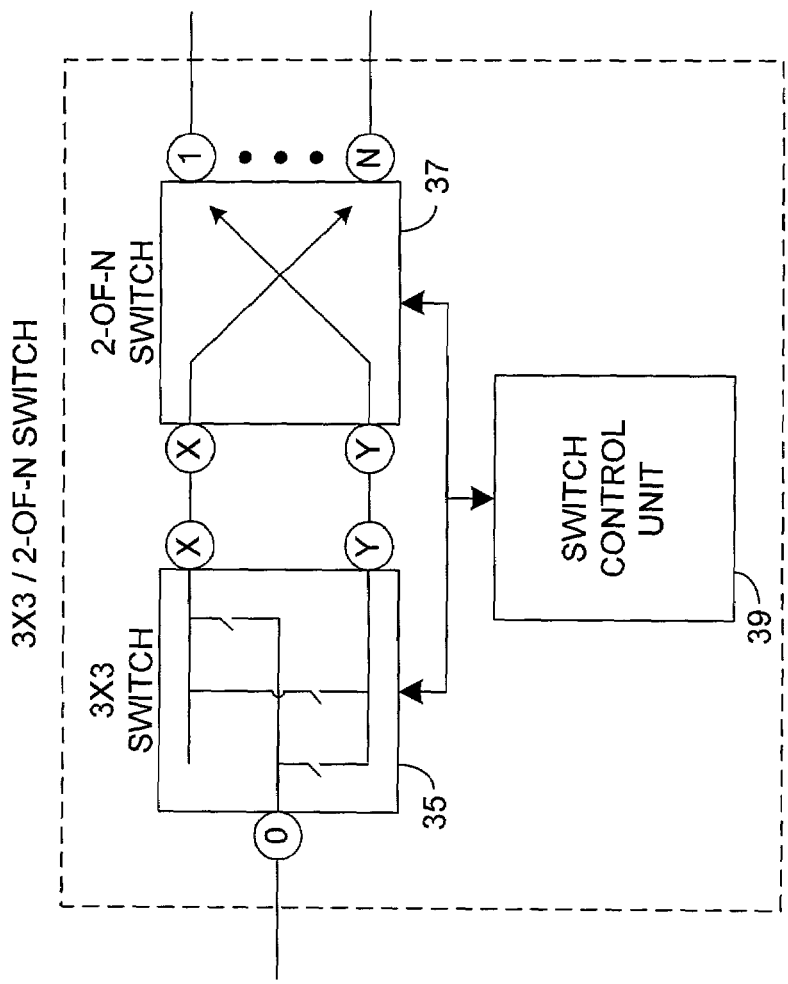
FIG. 4 illustrates a full 3×3 switch that fronts an adaptive 2-of-N switch, in accordance with the present invention.
Figure 2:
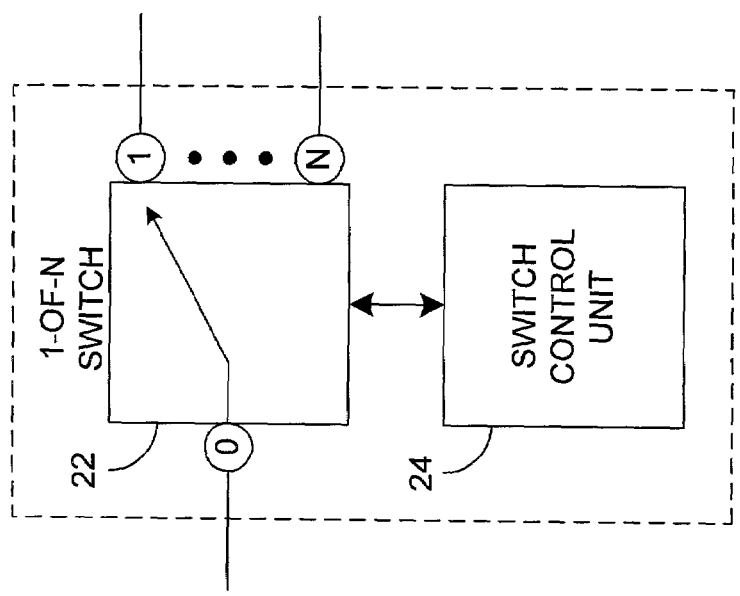
FIG. 2 illustrates an adaptive 1-of-N adaptive switch in accordance with the present invention.

In accordance with the present invention, one or more of the (N+1)×(N+1) switches, such as the 6×6 switches shown in FIG. 1, are replaced by a switch have more limited connectivity. FIG. 2 illustrates an adaptive 1-of-N switch 20, in accordance with the present invention, and FIG. 4 illustrates a combined switch 33 that comprises a full 3×3 switch that fronts an adaptive 2-of-N switch, in accordance with the present invention. First consider switch 20 of FIG. 2. Switch 20 includes a 1-of-N adaptive switch 22 and a switch control unit 24. Note that the complexity of switch 20 scales much more favorably than a (N+1)×(N+1) switch. In switch 20, the number of switch point is equal to N, so in a six module system, five switch points are required, and in a 16 module system, only 15 switch points are required. Also note that adaptive switch 20 does not dynamically route connections. In typical operation, switch 20 will couple a functional unit to a particular port, and this coupling will not change while the system is operating. Accordingly, switch 20 is significantly less complex than a full (N+1)×(N+1) switch that dynamically routes data. However, as described below, it may be desirable to signal switch 20 to connect to a different port in the event of an interconnection failure.

Figure 3:
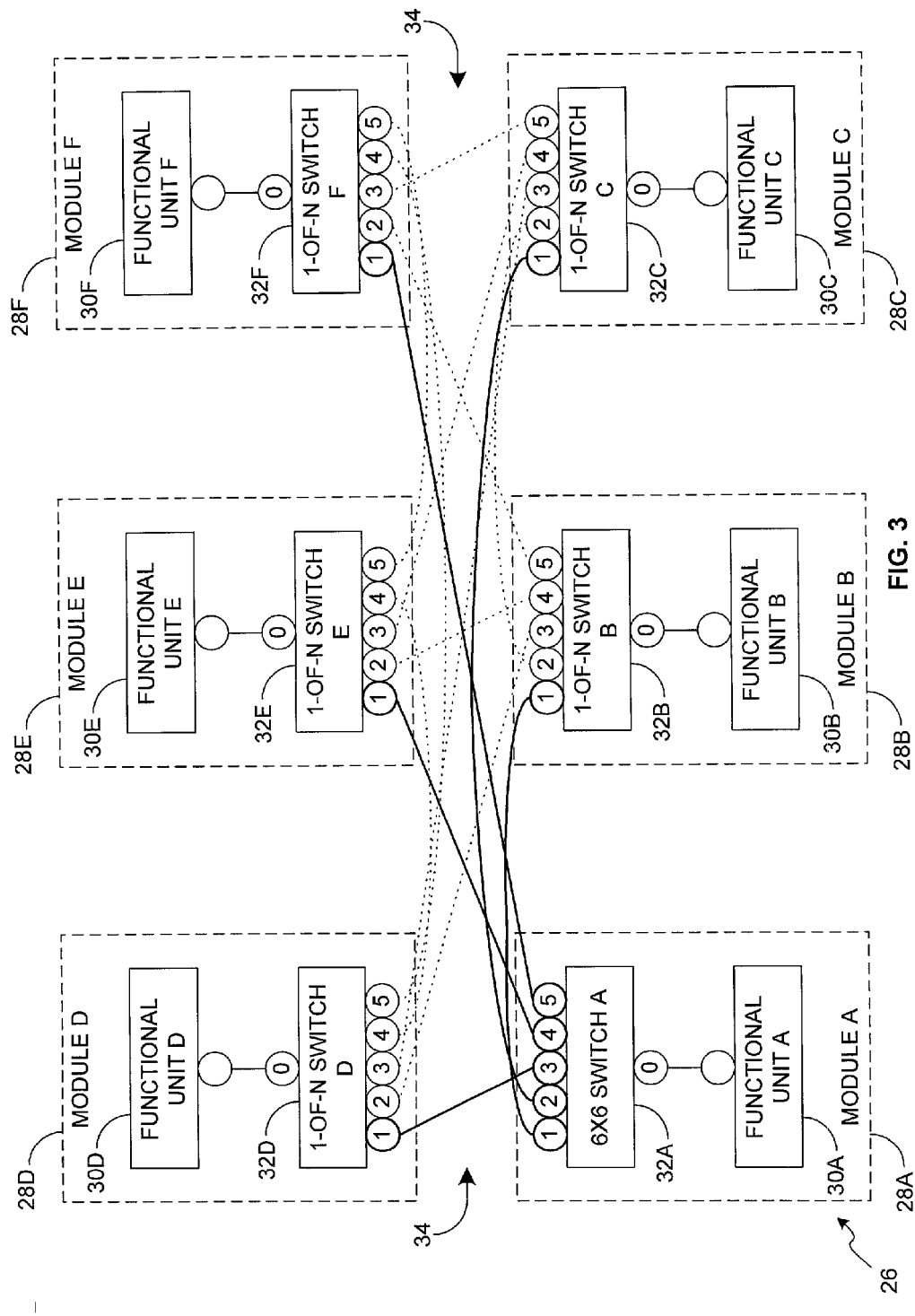
FIG. 3 illustrates a module-based computer system in accordance with the present invention having a full point-to-point interconnection fabric that provides unique connection paths between each pair of modules, with a single module having a full (N+1)×(N+1) switch capable of routing data to any other module, and the remainder of modules having the adaptive 1-of-N switch of FIG. 2.

In configurations using switch 20 of FIG. 2, when the system is initialized switch control unit 24 must manipulate 1-of-N switch 22 to discover another module capable of routing traffic from switch 20 to all other modules. One easy way to meet this requirement is to simply configure a system having one module with a full (N+1)×(N+1) switch, with the remaining modules having adaptive 1-of-N switches, such as switch 20. FIG. 3 illustrates such a system.

In FIG. 3, computer system 26 has a module 28A that includes a full 6×6 switch 32A. Each of the other modules 28B, 28C, 28D, 28E, and 28F include an adaptive 1-of-N switch 32B, 32C, 32D, 32E, and 32F, respectively. The adaptive 1-of-N switches are each identical to switch 20 of FIG. 2.

Note that in FIG. 3, interconnection fabric 34 is identical to interconnection fabric 18 of FIG. 1. However, all of the connection paths are not used. When each of the modules having an adaptive 1-of-N switch is initialized, switch control unit 24 of each switch searches for a module capable of routing traffic, and connects to that module. In FIG. 3, this is module 28A. Note that in FIG. 3, the active connection paths are shown as bold lines, while the inactive connection paths are shown as dotted lines.

It is possible to add a certain amount of redundancy to the configuration shown in FIG. 3. Assume that a second module in FIG. 3 also has a full (N+1)×(N+1) switch. If any connection between a module having a 1-of-N switch and a full (N+1)×(N+1) switch fails, the module having the adaptive 1-of-N switch can change the active port to the port coupled to the other module having the full (N+1)×(N+1) switch.

Note that the control logic required by switch control unit 24 is quite simple. When initialized, unit 24 simply searches for a module having a switch capable of routing traffic to all other modules. If a failure occurs, unit 24 searches for another module capable of routing traffic.

FIG. 3 illustrates several important features provided by the present invention. Only a single design for the interconnection fabric is required. The same design is used for a high end system, such as that shown in FIG. 1, and a low end system, such as that shown in FIG. 3. Only one module need have a full (N+1)×(N+1) switch, and the other modules have simpler adaptive 1-of-N switches. As mentioned above, the functional units can be provided with the switches as a single FRU, or the switches can be separate FRUs. Also note that the same design can be used for each functional unit, since the switches contain all the logic required to route data between modules.

Furthermore, if a customer wishes to upgrade the system, the customer need only replace a module (or just the switch, depending on how the FRU is implemented) with a module having a full (N+1)×(N+1) switch. As adaptive 1-of-N switches are replaced with full (N+1)×(N+1) switches, redundancy and throughput increase, and the interconnection fabric evolves from a switched interconnection fabric to a full point-to-point interconnection fabric.

Now consider combined 3×3/2-of-N switch 33 of FIG. 4. Switch 33 has a full 3×3 switch 35 that fronts an adaptive 2-of-N switch 37. Switch 33 is a full (N+1)×(N+1) switch capable of routing data dynamically, such as the 6×6 switches shown in FIG. 1. However, switch 37 is an adaptive switch that will make connections when initialized, and typically the connections will not change during normal operation.

Switch control unit 39 controls switches 35 and 37. Compared to switch 20 of FIG. 2, switch 33 has an additional overhead of four switch points in the full 3×3 switch 35. In addition, adaptive 2-of-N switch requires 2N switch points. Therefore, while the number of switch points of switch 33 scales at a rate greater than switch 20 as N increases, the rate is still much more favorable than a full (N+1)×(N+1) switch.

Figure 5:
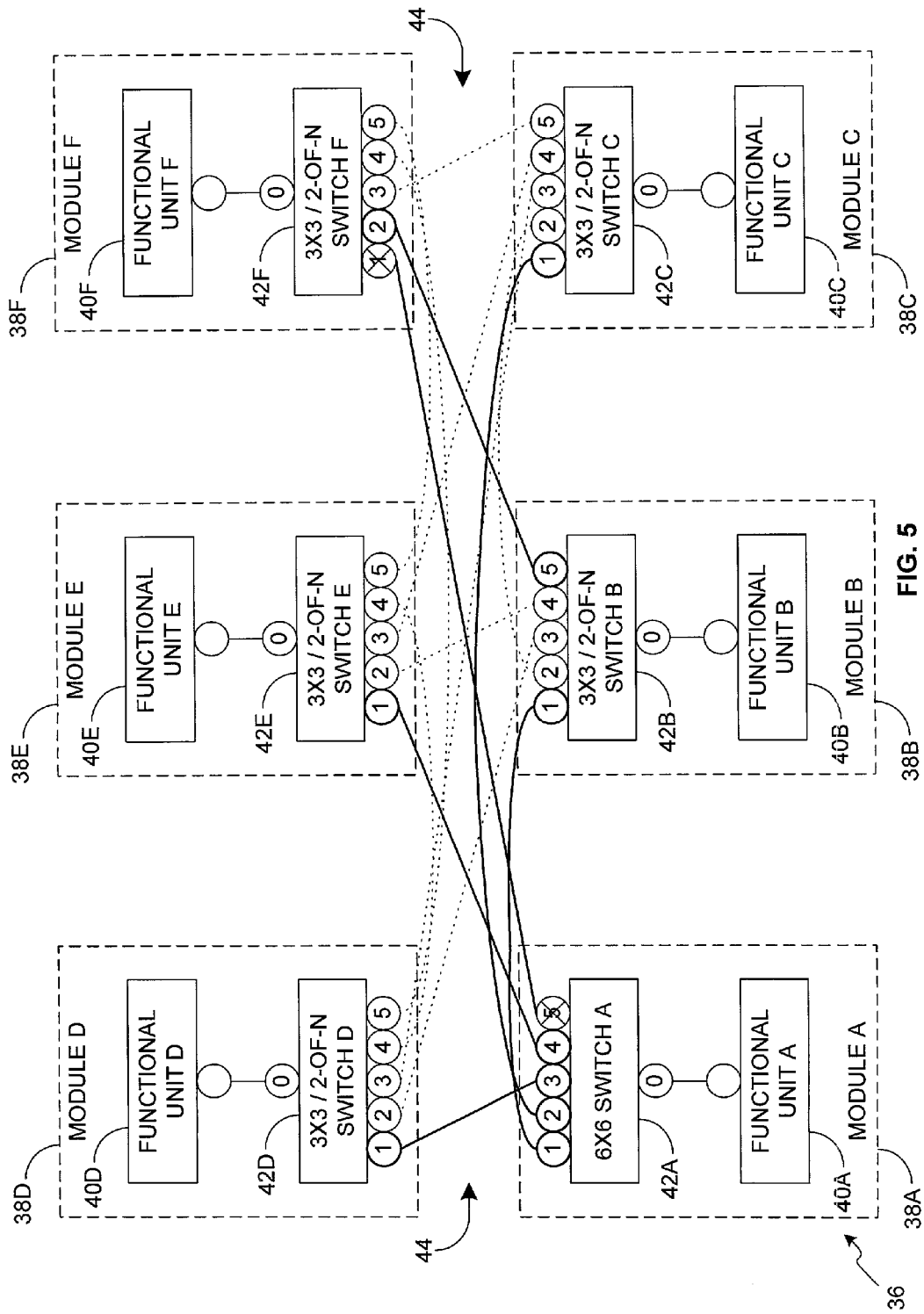
FIG. 5 illustrates a module-based computer system in accordance with the present invention having a full point-to-point interconnection fabric that provides unique connection paths between each pair of modules, with a single module having a full (N+1)×(N+1) switch capable of routing data to any other module, and the remainder of modules having the combined 3×3/2-of-N switch shown in FIG. 4.

The ability of switch 33 to dynamically route data between the functional unit and two active ports can be used to either provide additional redundancy and bandwidth, or allow the modules to be coupled into a ring topology. FIG. 5 illustrates a configuration where instances of switch 33 are used to provide additional redundancy.

In FIG. 5, computer system 36 has a module 38A that includes a full 6×6 switch 42A. Each of the other modules 38B, 38C, 38D, 38E, and 38F include 3×3/2-of-N switch 42B, 42C, 42D, 42E, and 42F, respectively. The 3×3/2-of-N switches are each identical to switch 33 of FIG. 4.

Again, interconnection fabric 44 in FIG. 5 is identical to interconnection fabric 18 of FIG. 1. However, all of the connection paths are not used. When each of the modules having a 3×3/2-of-N switch are initialized, switch control unit 39 of each switch searches for a module capable of routing traffic, and connects to that module. In FIG. 5, this is module 38A. As in FIG. 3, the active connection paths are shown as bold lines, while the inactive modules are shown as dotted lines.

However, each of the modules 38B, 38C, 38D, 38E, and 38F allow a second port to be active also, and this port can be used to provide redundancy. In FIG. 5, the connection between port 1 of module 38F and port 5 of module 38A has failed. When this condition is detected, switch control unit 39 of switch 42F searches for another module capable of routing traffic via an additional hop. In this case, unit 39 of switch 42F discovers that data can be routed via port 2 to module 38B, and requests that module 38B establish a connection for module 38F. Accordingly, switch control unit 39 of switch 42B activates port 5, and unit 39 of switch 42F activates port 2, thereby completing a connection between modules 38F and 38B. Module 38B can then route the traffic of module 38F to module 38A, which has a full (N+1)×(N+1) switch and can route the traffic to any of the remaining modules. Note that the redundant active port is really not needed by the module that has a failed connection. Rather, the redundant active port is required by the module that is called upon to provide the secondary active connection path.

When system 36 is initialized, each of the modules having a 3×3/2-of-N switch simply searches for a module capable of routing data to the other modules, as in FIG. 3. If N is even, it is also possible to establish active redundant paths at initialization for all modules having the 3×3/2-of-N switch. For example, assume that only modules 38A–38E are present, and module 38F has been removed. At initialization, a redundant active path can be established between port 2 of module 38B and port 3 of module 38C, and between port 4 of module 38D and port 4 of module 38E. Establishing the redundant active path at initialization can save time because it is not necessary to search for another path if the primary path fails during operation. If N is odd, it is still possible to assign active redundant paths at initialization, but one module will not have a redundant active path. However, if the active path to this module fails, the module can request that one of the other modules relinquish its redundant active connection and provide an active connection for the requesting module. Of course, as discussed above with reference to FIG. 5, it is also possible to assign a redundant active path after a failure of the primary active path is detected.

Figure 6:
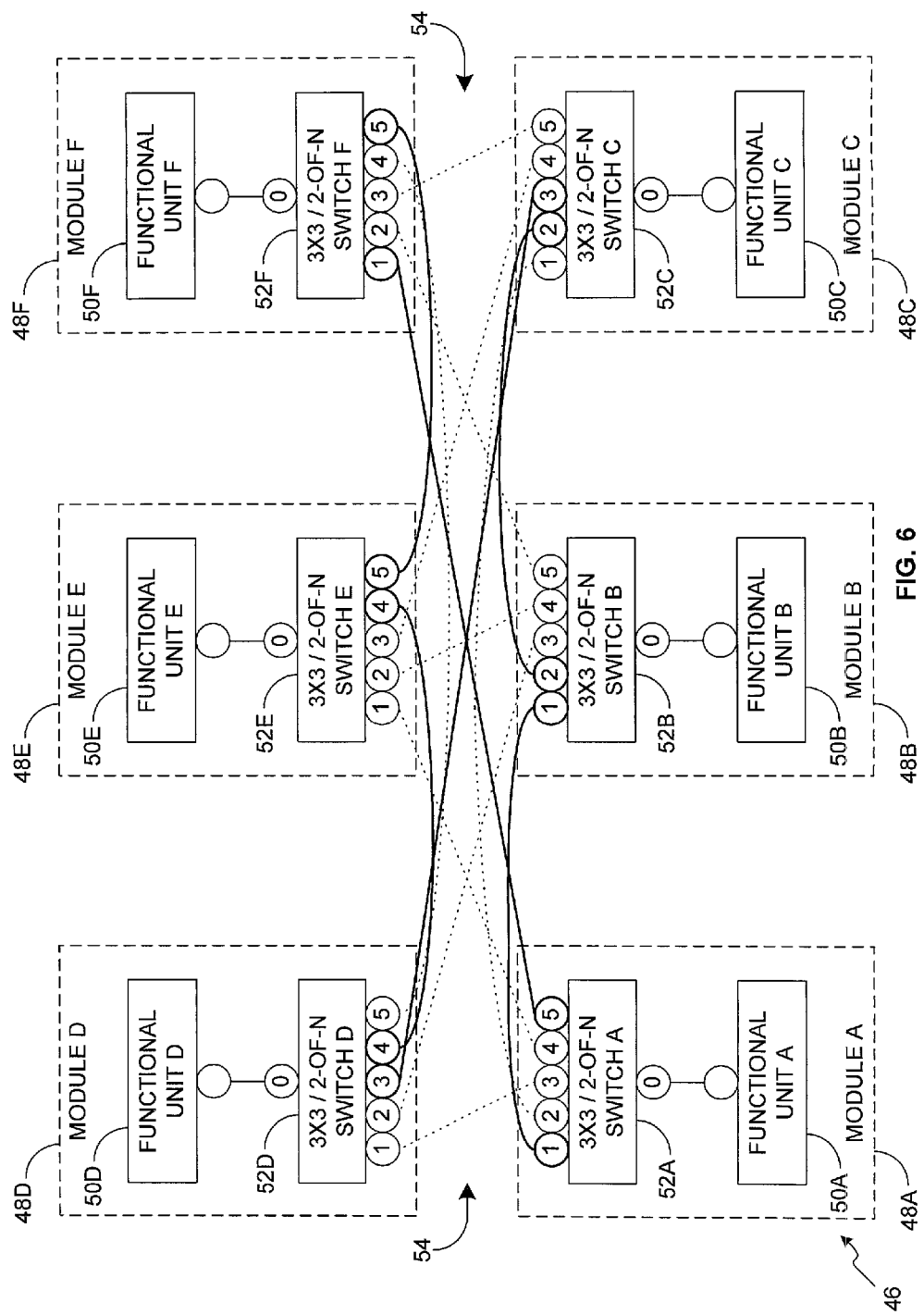
FIG. 6 illustrates a module-based computer system in accordance with the present invention having a full point-to-point interconnection fabric that provides unique connection paths between each pair of modules, with each module having the combined 3×3/2-of-N switch shown in FIG. 4, and the modules connected together in a ring topology.

FIG. 6 illustrates a computer system 46 in which the modules are coupled into a ring topology. In FIG. 6, modules 48A, 48B, 48C, 48D, 48E, and 48F include 3×3/2-of-N switches 52A, 52B, 52C, 52D, 52E, and 52F, respectively. The 3×3/2-of-N switches are each identical to switch 33 of FIG. 4.

Again, interconnection fabric 54 in FIG. 6 is identical to interconnection fabric 18 of FIG. 1. However, all of the connection paths are not used. To initialize computer system 46, the modules can be initialized in a module order. For example, module 48A is initialized first, module 48B is initialed second, and so on. When each of the modules is initialized, switch control unit 39 of each switch searches for a module capable of routing all traffic to determine whether a switched fabric can be formed, as in FIG. 5. However, in FIG. 6, this search will fail because no single module is capable of routing traffic to all other modules. Accordingly, the module being initialized will simply connect the next module in the series, with port 1 of module 48A connecting to port 1 of module 48B, port 2 of module 48B connecting to port 2 of module 48C, and so on. When the last module (48F in FIG. 6) is reached, this module will detect that it is the last module in the series of modules, and it will connect back to the first module to complete the ring. Therefore, in FIG. 6, port 1 of module 48F connects back to port 5 of module 48A. As in FIGS. 3 and 5, the active connection paths are shown as bold lines, while the inactive modules are shown as dotted lines.

The configuration shown in FIG. 6 reduces costs even further because none of the modules require a relatively expensive full (N+1)×(N+1) switch. And yet, this configuration provides redundancy. If any single connection between modules fail, traffic can still be routed around the ring in the other direction.

As in the configurations shown in FIGS. 3 and 5, the configuration of FIG. 6 uses the same design for the interconnection fabric and functional units as the high end configuration shown in FIG. 1. Furthermore, the customer can expand the system. By simply replacing one of the modules with a module having a full (N+1)×(N+1) switch, the interconnection fabric evolves from a ring topology to a higher performing switched topology, as shown in FIGS. 3 and 5. As additional modules are replaced with modules having a full (N+1)×(N+1) switch, the interconnection fabric evolves from a switched topology to a point-to-point topology, as shown in FIG. 1.

The present invention has been described herein with reference to generic depictions of modules, functional units, switches, and interconnection fabrics. Those skilled in the art will recognize that additional implementation details will, of course, need to be defined to implement any particular system. For example, if the interconnection fabric is implemented using packet-based networking protocols, various address decoding logic, routing logic, packet buffers, and the like, will be necessary, as is known in the art. If the interconnection fabric is implemented as a series of parallel busses, various control signals, clock signals, bus arbitration techniques, and the like, will be necessary, as is known in the art. Even though such details are not disclosed herein, one skilled in the art will find the teachings disclosed herein and in the Figures to be sufficient to design a system having full interconnection paths between any pair of modules, with one or more of the modules having adaptive switches capable of only maintaining active paths to a subset of the interconnection paths.

Also note that in the discussion above, relatively simple algorithms for establishing active connections were disclosed for switch control unit 24 of switch 20 of FIG. 2 and switch control unit 39 of switch 33 of FIG. 4. However, advantageous results can be achieved by using more sophisticated algorithms. For example, in a configuration having two modules with full (N+1)×(N+1) switches, and the remainder of modules having adaptive 1-of-N switches, it may be desirable to monitor interconnect traffic and reconfigure the adaptive 1-of-N switches to balance traffic loads. Alternatively, consider computer system 36 of FIG. 5. After monitoring interconnect traffic, it may be determined that a large amount of traffic flows between modules 38C and 38E. Accordingly, an active path can be established between port 4 of module 38C and port 3 of module 38E using the secondary connection provided by switch 33 of FIG. 4. Such a configuration would remove this traffic from the full (N+1)×(N+1) switch of module 38A, thereby increasing throughput.

The present invention has been described above with reference to an adaptive 1-of-N switch and a full 3×3 switch that fronts an adaptive 2-of-N switch. However, the present invention is not limited to these two embodiments. Additional redundancy and bandwidth a can be achieved by switches that support additional active connections, but still have less connectivity than a full (N+1)×(N+1) switch. For example, a full 4×4 switch that fronts an adaptive 3-of-N switch will provide three active connection ports, a full 5×5 switch that fronts an adaptive 4-of-N switch will provide four active connections, and so on. In general terms, such a switch in accordance with the present invention is a full M×M switch that fronts an adaptive (M−1)-of-N switch, where $3 \leq M \leq N$. In systems having many modules, these switches may strike the perfect balance between switch complexity, cost, redundancy, and bandwidth. One skilled in the art will understand how to adapt the teachings herein to design such a switch.

The modular design of the present invention provides many advantages over the prior art. First, only a single design is needed for the interconnection fabric and the functional units. Only the design of the switches need vary. Using a single design provides tremendous cost and time advantages when designing, debugging, and manufacturing a system. Accordingly, a single design is capable of supporting a wide array of computer systems from low end systems to high end systems.

Furthermore, the present invention provides a very easy and cost effective upgrade path for customers. As a system is upgraded by replacing modules having 1-of-N switches and 3×3/2-of-N switches with modules having full (N+1)×(N+1) switches, the interconnection fabric seamlessly and automatically evolves from a ring topology or switched topology to a full point-to-point topology without any additional configuration required by the customer.

Although the present invention has been described with reference to preferred embodiments, workers skilled in the art will recognize that changes may be made in form and detail without departing from the spirit and scope of the invention.

What is claimed is:

1. A digital system comprising:

N+1 modules, wherein $N \geq 2$;

an interconnection fabric that provides unique connection paths between all pairs of modules of the N+1 modules;

an adaptive switch provided in at least one of the N+1 modules, wherein the adaptive switch has at least one and less than N active connections to the unique connection paths that couple modules having adaptive switches to all other modules of the N+1 modules, and data is capable of flowing between the module that provides the adaptive switch and all other modules by routing data through other intermediate modules of the N+1 modules, wherein at least one of the N+1 modules includes a full (N+1)×(N+1) switch, and each module having an adaptive switch creates an active connection to the module having the full (N+1)×(N+1) switch, wherein the adaptive switch is a full 3×3 switch that fronts an adaptive 2-of-N switch, wherein the active connection to the module having the full (N+1)×(N+1) switch is a primary active connection, and a secondary active connection is present between the full 3×3 switch that fronts the adaptive 2-of-N switch and a module of the N+1 modules other than the module having the full (N+1)×(N+1) switch, and wherein the secondary active connection provides increased bandwidth by routing data between a pair of modules via the secondary active connection in addition to data routed to the module having the full (N+1)×(N+1) switch via the primary connection.

2. The digital system of claim 1 wherein the adaptive switch is a 1-of-N adaptive switch.

3. The digital system of claim 1 wherein the secondary active connection provides redundancy for the primary active connection.

4. The digital system of claim 1 wherein the adaptive switch is the full 3×3 switch that fronts the adaptive 2-of-N switch in each of the N+1 modules, and the modules are coupled together in a ring topology.

5. The digital system of claim 1 wherein the adaptive switch is a full M×M switch that fronts an adaptive (M−1)-of-N switch, wherein $3 \leq M \leq N$.

6. A method coupling together N+1 modules in a digital system, wherein $N \geq 2$, via an interconnection fabric that provides unique connection paths between all pairs of modules of the N+1 modules, and at least one of the N+1 modules has an adaptive switch that has at least one and less than N active connections to the unique connection paths that couple modules having adaptive switches to all other modules of the N+1 modules, the method comprising:
for each module having an adaptive switch, forming an active connection to another of the N+1 modules capable of routing data to all other modules using an adaptive switch that has at least one and less than N active connections to the unique connection paths that couple the modules having adaptive switches to all other modules of the N+1 modules, wherein at least one of the N+1 modules includes a full (N+1)×(N+1) switch, and forming an active connection to another of the N+1 modules capable of routing data to all other modules;
forming an active connection to the module having the full (N+1)×(N+1) switch, wherein the adaptive switch is a full 3×3 switch that fronts an adaptive 2-of-N switch and wherein the active connection to the module having a full (N+1)×(N+1) switch is a primary active connection; and
forming a secondary active connection between the full 3×3 switch that fronts the adaptive 2-of-N switch and a module of the N+1 modules other than the module having the full (N+1)×(N+1) switch, wherein the secondary active connection provides increased bandwidth by routing data between a pair of modules via the secondary active connection in addition to data routed to the module having the full (N+1)×(N+1) switch via the primary connection.

7. The method of claim 6 wherein the adaptive switch is a 1-of-N adaptive switch.

8. The method of claim 6 wherein the secondary active connection provides redundancy for the primary active connection.

9. The method of claim 6 further comprising:
each adaptive switch forming active connections with adaptive switches of adjacent modules to couple modules together in a ring topology.

10. The method of claim 6 wherein the adaptive switch is a full M×M switch that fronts an adaptive (M−1)-of-N switch, and $3 \leq M \leq N$.

11. An adaptive switch for coupling a module to N other modules comprising:
a full M×M switch comprising:
a first connection point coupled to at least one functional unit in the module; and
M−1 additional connection points, wherein $3 \leq M \leq N$, and the full M×M switch can dynamically route data between each pair of connection points; and
adaptive (M−1)-of-N switch comprising:
M−1 connection points, with each of the M−1 connection points of the adaptive (M−1)-of-N switch uniquely coupled to one of the M−1 additional connection points of the full M×M switch; and
N port connection points capable of being coupled to each of the N other modules when the adaptive switch is deployed in an interconnection fabric having point-to-point interconnection paths between all pairs of modules, wherein the adaptive switch selectively maintains unique static connection paths between the M−1 connection points of the adaptive (M−1)-of-N switch and the N port connection points of the adaptive (M−1)-of-N switch.

12. The adaptive switch of claim 11 wherein M is 3.

* * * * *